No. 763,419. PATENTED JUNE 28, 1904.
J. OFFERMANN.
FOLDING SQUARE.
APPLICATION FILED APR. 4, 1904.
NO MODEL.

WITNESSES
P. S. Hanson.
M. Hagerty.

INVENTOR
JOSEPH OFFERMANN.
BY Paul & Paul
HIS ATTORNEYS.

THE NORRIS PETERS CO., PHOTO-LITHO., WASHINGTON, D. C.

No. 763,419. Patented June 28, 1904.

UNITED STATES PATENT OFFICE.

JOSEPH OFFERMANN, OF MINNEAPOLIS, MINNESOTA.

FOLDING SQUARE.

SPECIFICATION forming part of Letters Patent No. 763,419, dated June 28, 1904.

Application filed April 4, 1904. Serial No. 201,389. (No model.)

*To all whom it may concern:*

Be it known that I, JOSEPH OFFERMANN, of Minneapolis, Hennepin county, Minnesota, have invented certain new and useful Improvements in Folding Squares, of which the following is a specification.

My invention relates to folding steel squares designed particularly for carpenters' use; and the object of the invention is to provide a square having arms that can be adjusted with respect to one another to vary the angle between them and adapt the tool for use in a right angle or on a bevel.

The invention consists generally in improved means for securing the two arms of the square together.

Figure 1:
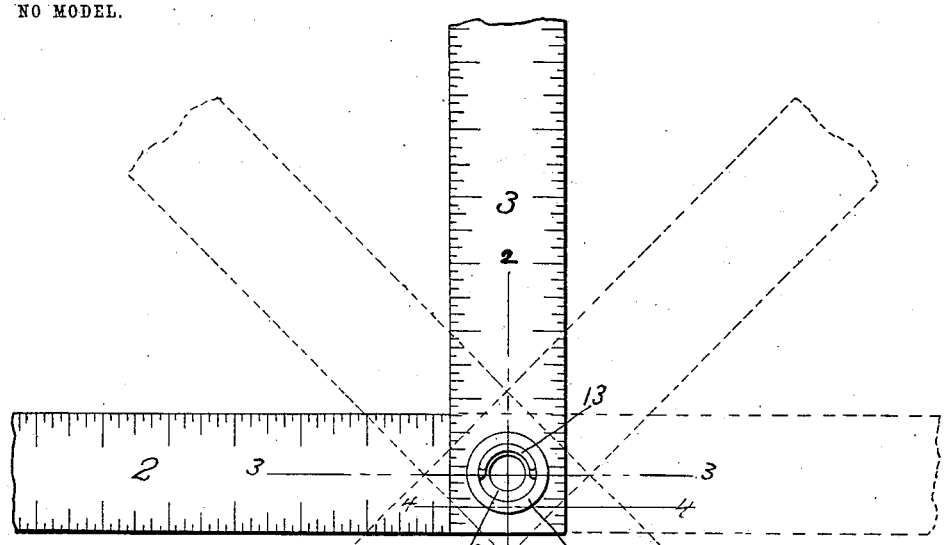
Figure 2:
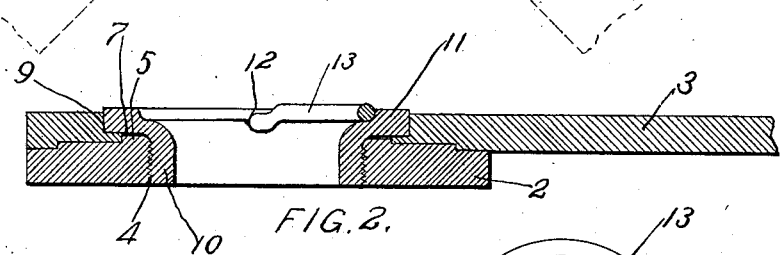
Figure 3:
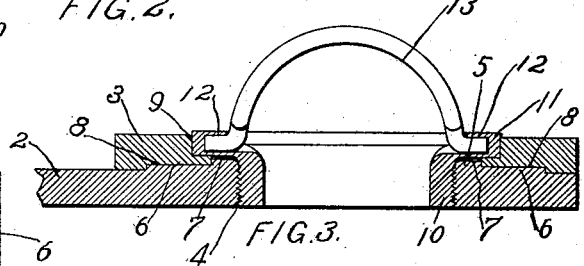
Figures 4, 5:
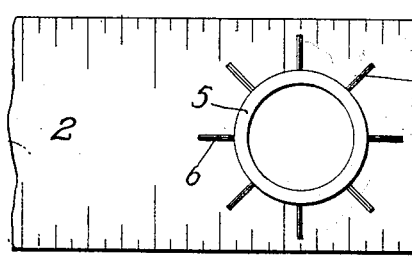

In the accompanying drawings, forming part of this specification, Figure 1 is a plan view of a square embodying my invention. Fig. 2 is a transverse section on the line 2 2 of Fig. 1. Fig. 3 is a similar view on the line 3 3 of Fig. 1. Fig. 4 is a section on the line 4 4 of Fig. 1. Fig. 5 is a plan view of the pivoted end of one of the arms.

In the drawings, 2 represents one of the arms and 3 the other, both of usual size and shape. The arm 2 is provided with an interiorly-threaded hole 4, surrounded by an annular rib or ring 5, outside of which in the surface of said arm and radiating from said ring at intervals is a series of ribs 6, that are preferably wedge-shaped in cross-section. The arm 3 has a hole 7 adapted to register with the hole in the arm 2 and receive the ring 5, and around the hole in said arm 3 I provide a series of grooves 8, adapted to receive the ribs 6 when the parts are placed together and prevent the accidental movement of the arms when the proper adjustment has been made. The grooves are of sufficient size to allow the ribs to adjust themselves therein and equalize the wear between the contacting surfaces of the arms.

An annular recess 9 is provided in the arm 3 around the hole therein, and an exteriorly-threaded sleeve 10 is arranged to enter the holes in said arms and is provided with an outwardly-turned flange 11 at one end to enter the recess 9 and, bearing on the bottom thereof, press the ribs into the grooves and lock the arms firmly together, sufficient space being provided between the shoulder 5 and the flange 11 to prevent said flange from contacting therewith before it engages the bottom of the recess 9.

I prefer to provide sockets 12 in the flange 9 to receive the ends of a finger-piece 13, that is adapted to swing down within the sleeve when not in use and be raised to a vertical position, as shown in Fig. 3, where it can be grasped by the fingers of the operator to loosen the sleeve and permit readjustment of the arms or to tighten them. This finger-piece when the square is in use is turned down into the sleeve, where it will not interfere with the handling of the tool.

It will be noted that the mechanism securing the arms of the square together is substantially flush with the surfaces of the arms, thereby permitting the tool to be laid flat on a surface. The engagement of the ribs with the grooves will form a positive lock and prevent any possibility of the arms slipping after the desired adjustment has been obtained.

I claim as my invention—

1. A folding square comprising two arms, one of them having a threaded hole adapted to register with a hole in the other arm, one of said arms having a series of ribs radiating from the hole therein and adapted to enter grooves correspondingly arranged in the surface of the other arm, an exteriorly-threaded sleeve arranged to enter said holes and bind said arms together.

2. A folding square comprising two arms, one having a threaded hole adapted to register with a hole in the other arm, and a shoulder surrounding said threaded hole, the other arm having an annular recess around its hole, an exteriorly-threaded sleeve fitting said holes and having a laterally-extending flange to enter and bear upon the bottom of said recess, and a suitable finger-piece carried by said sleeve.

3. A folding square comprising two arms, one having a threaded hole adapted to register with a hole in the other arm, and a shoulder surrounding said threaded hole, an annular recess being provided in said second-named arm around the hole therein, an exteriorly-threaded sleeve adapted to enter said holes and having a laterally-extending flange to bear upon the bottom of said recess, a finger-piece in said sleeve, and a series of ribs provided on said first-named arm radiating from the hole therein and adapted to enter grooves in said second-named arm, substantially as described.

4. A folding square comprising an arm having a threaded hole therein and a shoulder or ring inclosing the same and extending above the surface of said arm, a second arm having a hole of greater diameter than the one in said first-named arm and concentric therewith and provided with an annular recess inclosing said hole, the bottom of said recess being normally above the top of said shoulder or ring, an exteriorly-threaded sleeve fitting within said holes and provided with a laterally-extending flange to enter said recess, and a pivoted finger-piece carried by said sleeve, for the purpose specified.

In witness whereof I have hereunto set my hand this 28th day of March, 1904.

JOSEPH OFFERMANN.

In presence of—
 RICHARD PAUL,
 M. HAGERTY.